Figure 1:
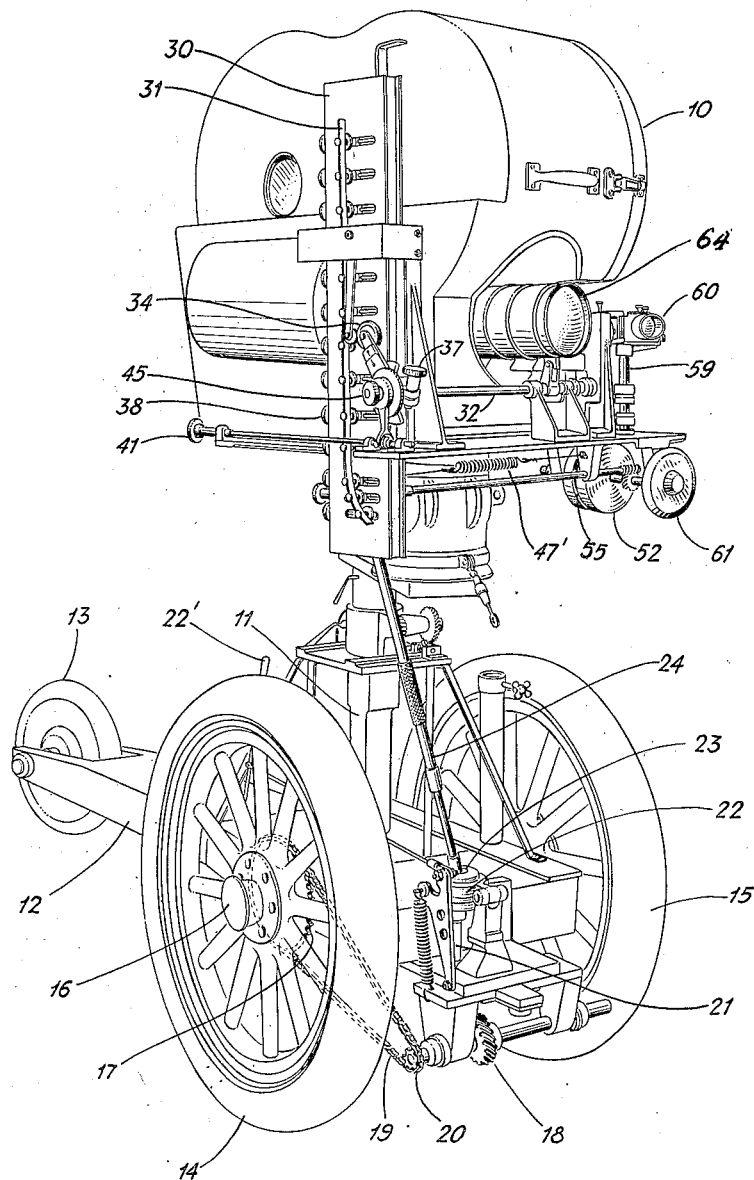

June 29, 1937.  D. M. JAHRAUS ET AL  2,085,193
MOTION PICTURE CAMERA
Filed June 14, 1932  4 Sheets-Sheet 2

INVENTORS
DONALD M. JAHRAUS
ROY HUNT
BY
ATTORNEY

June 29, 1937.   D. M. JAHRAUS ET AL   2,085,193
MOTION PICTURE CAMERA
Filed June 14, 1932   4 Sheets-Sheet 3
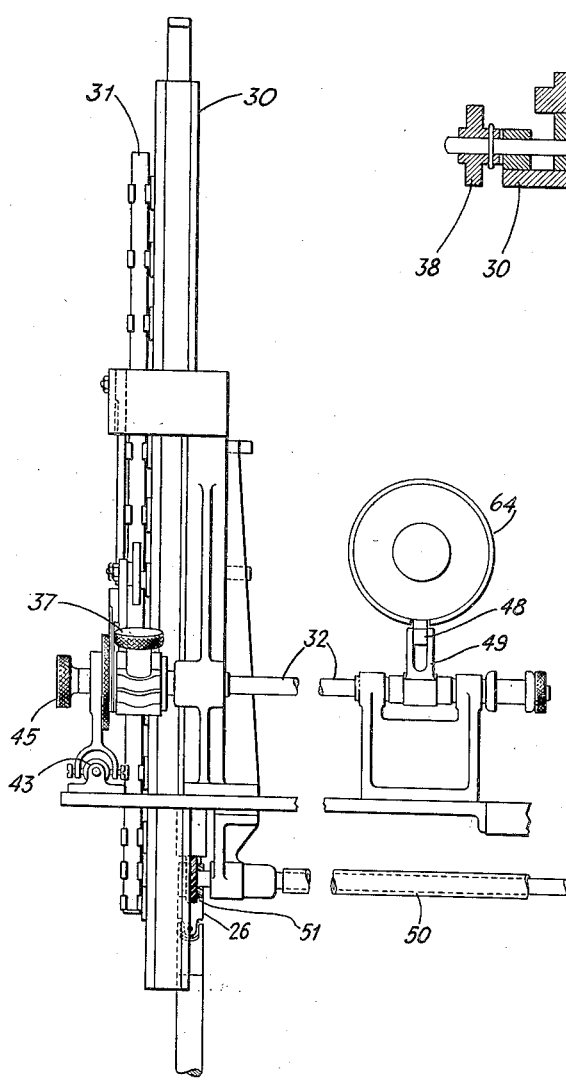
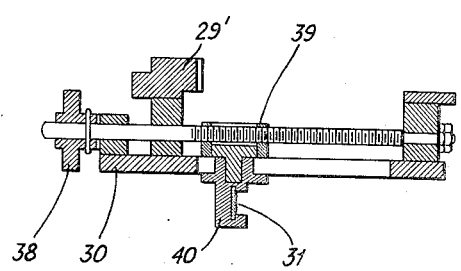
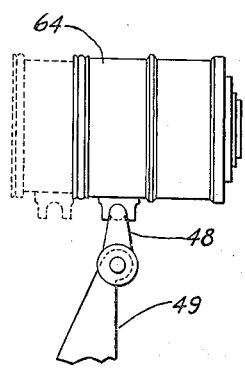
INVENTORS
DONALD M. JAHRAUS
ROY HUNT
BY
ATTORNEY

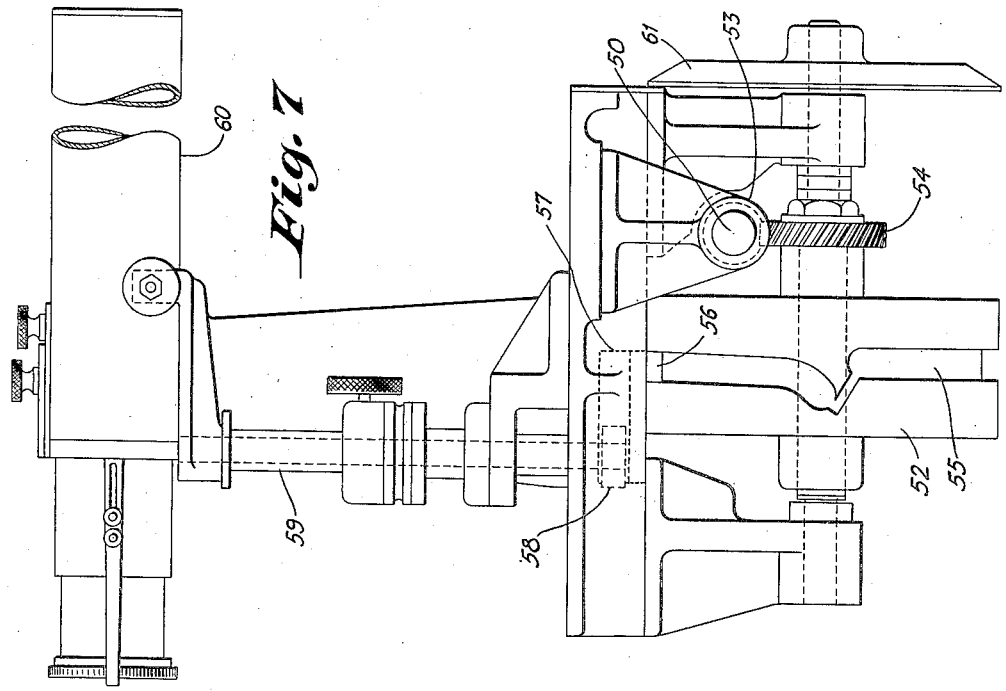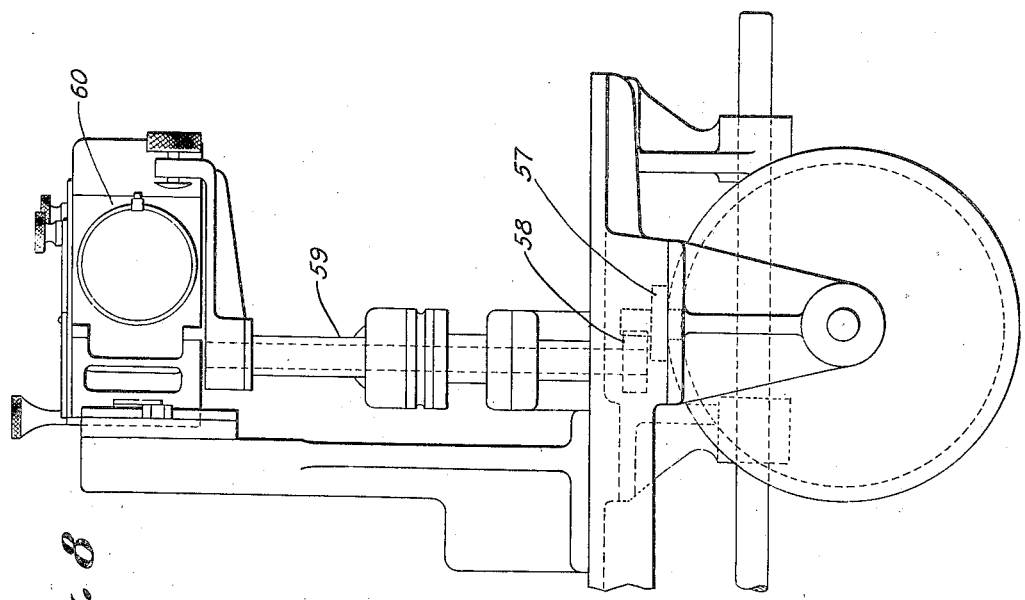

Patented June 29, 1937

2,085,193

UNITED STATES PATENT OFFICE 2,085,193

MOTION PICTURE CAMERA

Donald M. Jahraus, North Hollywood, and Roy Hunt, Canoga Park, Calif., assignors to Radio Corporation of America, a corporation of Delaware Application June 14, 1932, Serial No. 617,098

1 Claim. (Cl. 88—16)

Our invention relates to motion picture cameras, and has for its principal object the provision of an improved apparatus whereby such a camera is focused automatically.

A further object is the provision of an improved motion picture camera which is focused in response to its movement from one point to another.

Another object is the provision of a picture taking or recording apparatus including a movable support and a focusing element which are so intercoupled with one another that proper focusing is maintained when the apparatus is moved from one point to another thereby permitting the operator to direct his attention solely to the movement of the apparatus into proper relation with the scene to be recorded.

An auxiliary object is the provision of a camera view finder which is automatically controlled in response to movement of the support on which it is mounted.

In the recording of motion pictures, it is frequently desirable to move the camera quickly from one point to another for the purpose of recording different views of a set or scene. It is desirable that this movement be made very rapidly in order to minimize the time required to record the different views of the scene. In the use of automatic focusing devices heretofore provided, considerable time has been consumed in focusing the camera and adjusting the view finder after the desired point has been reached. In accordance with our invention, this loss of time is avoided by the provision of an improved focusing and adjusting means which are readily manipulated and are operated automatically in response to movement of the apparatus.

Our invention will be better understood from the following description, when considered in connection with the accompanying drawings, and its scope will be pointed out in the appended claim.

Figure 2:
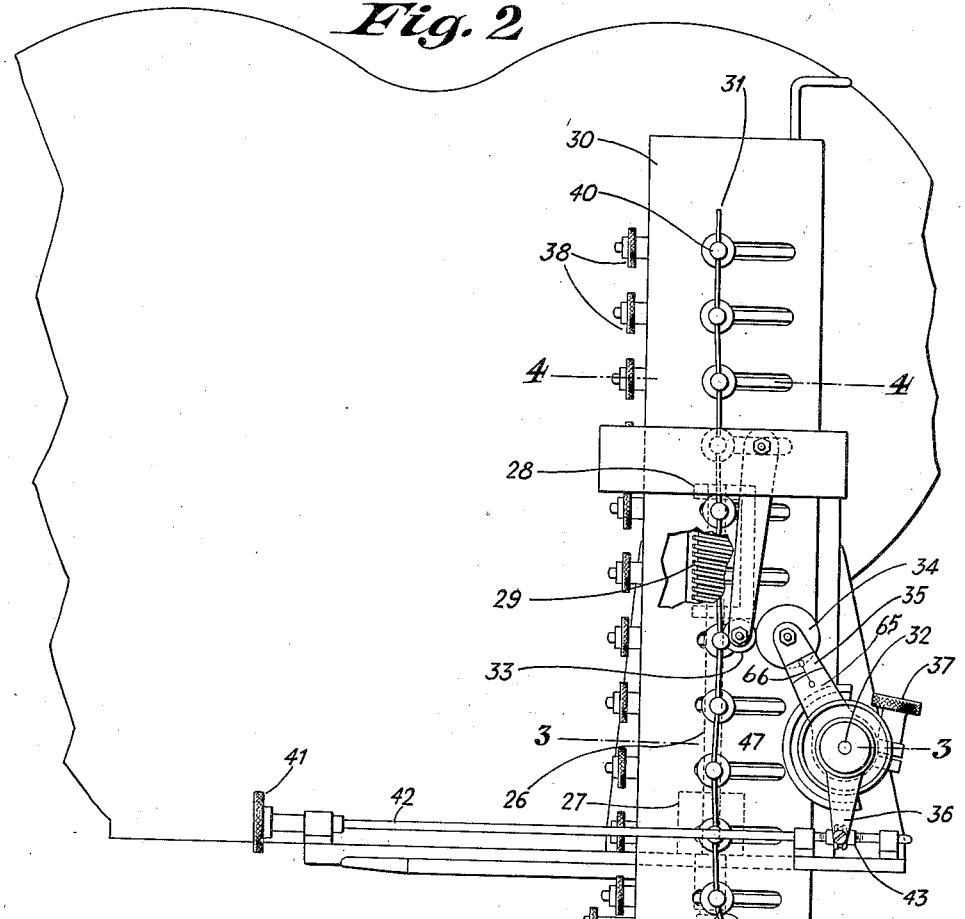
Figure 3:
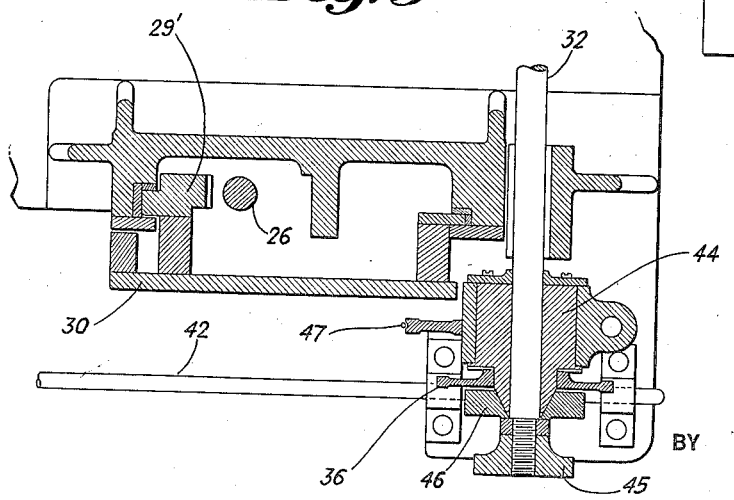

Referring to the drawings,

Fig. 1 illustrates a motion picture camera wherein our invention has been embodied, Fig. 2 illustrates the adjustable cam arrangement whereby the camera is automatically focused in response to its movement, Fig. 3 illustrates certain details in the cam adjusting mechanism, Figs. 4, 5 and 6 are different views of the focusing mechanism, and Figs. 7 and 8 illustrate the adjusting mechanism of the view finder.

The apparatus in connection with which the invention has been illustrated includes a camera head provided with a soundproof cover 10 and mounted on a pedestal 11 supported upon a movable base 12 provided with wheels 13, 14 and 15. Mounted upon the shaft 16 of the wheels 14 and 15 is a sprocket 17 arranged to drive a gear 18 through a chain 19 and sprocket 20. Power is transmitted from the gear 18 to the automatic focusing part of the apparatus through a jack shaft 21, a clutch 22, a universal joint 23, a telescoping shaft 24, a universal joint 25 (Fig. 2) and a shaft 26 provided with bearings 27 and 28. A lever 22' is provided for disconnecting the clutch 22 so that the camera may be operated independently of the automatic focusing mechanism.

As shown more particularly in Figures 2 to 5, the shaft 26 is provided with a pinion 29 arranged to cooperate with a rack 29' mounted on the back of a cam plate 30 which supports a cam member 31. This cam member is in the form of a resilient band and is arranged to transmit motion to a focusing shaft 32 through a pair of rollers 33 and 34 and an arm 35 mounted on the shaft 32. An arm 36 is also arranged to be clamped to the shaft 32 in the manner hereinafter described. A thumb screw 37 is provided for clamping the hub of the arm 35 to the shaft 32.

Adjustment in the contour of the cam member 31 is effected by a plurality of thumb screws 38 located at the side of the cam plate 30 and threaded into sliding members 39 provided with extensions 40 to which the cam member 31 is attached. The structure of this particular part of the apparatus is illustrated more specifically in Figure 4, which is a section taken on the line 4—4 of Figure 2. It will be readily understood that by adjustment of the thumb screws 38 the surface of the cam plate 31 which cooperates with the roller 33 may be made to assume any desired form.

Adjustment of the lens in relation to the cam member 31 to ensure proper focus of the camera as it is moved from one point to another is effected by means of a thumb screw 41 mounted on the end of a shaft 42 and threaded into a collar 43 which cooperates with the lever 36. As shown more particularly in Figure 3, which is a section taken on the line 3—3 of Figure 2, the lever 36 is arranged to be clamped to the drum 44 by means of a thumb screw 45 and a tapered member 46. This drum is fixed to the shaft 32. By means of the thumb screw 37 the hub of the arm 35 is clamped to this drum. In adjusting the cam member 31 the thumb screw 37 is loosened to permit rotation of the hub of the roller arm 35 on the drum, the thumb screw 65 is tightened to clamp the lever 36 to the drum, and the thumb screw 61 is adjusted to focus the camera.

Since the roller arm 35 is held in contact with the roller 33 by means of a spring 47' (Fig. 1) attached to a pulley 47 (Fig. 3), the marks 65 on the upper extension 66 of the arm 36 and the arm 35 are moved out of alignment with one another. They are brought back into alignment by adjustment of the thumb screw 38 which corresponds to the particular part of the cam plate 30 undergoing adjustment. This operation is repeated throughout the length of the cam plate. When the cam plate has been completely adjusted the thumb screw 65 is loosened, thus permitting rotation of the hub of the arm 36 about the shaft 32, and the thumb screw 37 is tightened to clamp the hub of the roller arm 35 to the shaft. Under these conditions, the rollers 33 and 34, the arm 35, and the shaft 32 are moved in accordance with the contour of the surface of the cam 31; and the optical member 64 of the camera is automatically focused through the link members 48 and 49 interposed between it and the shaft 32. Any suitable means may be provided for guiding the cam plate 30 and the various parts which are mounted on it. A satisfactory form of guide is illustrated in Figure 3.

It is necessary for the operator of the apparatus to be able to see a correct image of the field photographed in the view finder. As the position of the object is constantly changing with the movement, the angle of the finder must also change. This result is accomplished in response to movement of the apparatus by means of a shaft 50 which is geared to the shaft 26 through gears 51 and drives a cam member 52 through a pair of gears 53 and 54. Upon the periphery of the cam member 52 a groove 55 designed to produce proper adjustment of the finder is provided. The drum 52 is geared to make one revolution with a complete movement of the cam plate 30. A roller 56 arranged to be actuated through the groove 55, operates through a rack 57, and a pinion 58 to move a shaft 59 for maintaining the proper adjustment of a view finder 60. Since the various parts of the view finder mechanism, aside from the particular driving means, is standard and well known to those skilled in the art, it is believed that their operation will be understood without detailed description. For the purpose of indicating the distance traveled, a calibrated dial 61 may be provided on the shaft of the drum 52.

Having thus described our invention, what we claim is:

A motion picture apparatus including an optical system, a view finder, a movable support, means including a cam member operable in response to movement of said support for focusing said system, means operable in response to said movement for adjusting said finder, and means for adjusting the contour of said member.

DONALD M. JAHRAUS.
ROY HUNT.